United States Patent
LaPierre et al.

(10) Patent No.: US 10,247,193 B2
(45) Date of Patent: Apr. 2, 2019

(54) RESERVOIR EGRESS FLUID COUPLER

(71) Applicant: United Technologies Corporation, Hartford, CT (US)

(72) Inventors: Todd M. LaPierre, Middleton, NH (US); Yuk-Kwan Brian Yuen, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 280 days.

(21) Appl. No.: 14/916,384

(22) PCT Filed: Sep. 8, 2014

(86) PCT No.: PCT/US2014/054457
§ 371 (c)(1),
(2) Date: Mar. 3, 2016

(87) PCT Pub. No.: WO2015/076902
PCT Pub. Date: May 28, 2015

(65) Prior Publication Data
US 2016/0215786 A1    Jul. 28, 2016

Related U.S. Application Data

(60) Provisional application No. 61/875,245, filed on Sep. 9, 2013.

(51) Int. Cl.
*F01D 25/18*    (2006.01)
*F04D 29/063*   (2006.01)
(Continued)

(52) U.S. Cl.
CPC ......... *F04D 29/063* (2013.01); *F01D 25/162* (2013.01); *F01D 25/18* (2013.01);
(Continued)

(58) Field of Classification Search
CPC .... F04D 29/063; F04D 29/321; F04D 29/102; F04D 29/056; F04D 29/582;
(Continued)

(56) References Cited

U.S. PATENT DOCUMENTS

| | | | |
|---|---|---|---|
| 4,080,783 | A | 3/1978 | Hamburg et al. |
| 5,494,128 | A | 2/1996 | Witthaus |

(Continued)

FOREIGN PATENT DOCUMENTS

| | | |
|---|---|---|
| JP | 2006144296 | 6/2006 |
| WO | 2010021573 | 2/2010 |
| WO | 2012080213 | 6/2012 |

OTHER PUBLICATIONS

Supplementary European Search Report for Application No. 14863476.9 dated Aug. 23, 2016.
(Continued)

*Primary Examiner* — Eldon T Brockman
(74) *Attorney, Agent, or Firm* — Carlson, Gaskey & Olds, P.C.

(57) ABSTRACT

A gas turbine engine includes a bearing support positioned fore of a compressor section along a primary flowpath. The bearing support internally includes a fluid reservoir with a reservoir tube, a fluid pump with a fluid pump tube, and a fluid coupler coupling the reservoir tube to the fluid pump tube.

18 Claims, 3 Drawing Sheets

(51) Int. Cl.
| | |
|---|---|
| *F02C 7/06* | (2006.01) |
| *F04D 29/053* | (2006.01) |
| *F04D 29/056* | (2006.01) |
| *F04D 29/10* | (2006.01) |
| *F04D 29/32* | (2006.01) |
| *F04D 29/58* | (2006.01) |
| *F01D 25/16* | (2006.01) |
| *F01D 25/20* | (2006.01) |
| *F16N 21/00* | (2006.01) |
| *F16L 5/02* | (2006.01) |
| *F16L 5/12* | (2006.01) |
| *F16L 21/00* | (2006.01) |

(52) U.S. Cl.
CPC .............. *F01D 25/20* (2013.01); *F02C 7/06* (2013.01); *F04D 29/053* (2013.01); *F04D 29/056* (2013.01); *F04D 29/102* (2013.01); *F04D 29/321* (2013.01); *F04D 29/582* (2013.01); *F16N 21/00* (2013.01); *F16L 5/025* (2013.01); *F16L 5/12* (2013.01); *F16L 21/002* (2013.01)

(58) Field of Classification Search
CPC ...... F04D 29/053; F01D 25/20; F01D 25/162; F16N 21/00; F02C 7/06; F16L 5/025; F16L 21/002; F16L 5/12
See application file for complete search history.

(56) References Cited

U.S. PATENT DOCUMENTS

| | | | |
|---|---|---|---|
| 6,102,577 A | | 8/2000 | Tremaine |
| 6,679,045 B2 | | 1/2004 | Karafillis et al. |
| 6,899,132 B2 | | 5/2005 | Mikiya et al. |
| 7,040,873 B2 | | 5/2006 | Dooley |
| 7,503,756 B2 | | 3/2009 | Dooley |
| 8,490,411 B2 | * | 7/2013 | Suciu ................. F02C 7/32 60/788 |
| 2004/0037696 A1 | | 2/2004 | Frosini et al. |
| 2006/0045404 A1 | | 3/2006 | Allmon et al. |
| 2007/0246302 A1 | * | 10/2007 | Bell .................... F01D 25/20 184/6.11 |
| 2009/0229690 A1 | | 9/2009 | Eccles et al. |
| 2010/0296947 A1 | | 11/2010 | DiBenedetto et al. |
| 2011/0259441 A1 | | 10/2011 | Luyendijk et al. |
| 2011/0297485 A1 | | 12/2011 | Sheridan et al. |
| 2012/0117982 A1 | * | 5/2012 | Suciu ................. F02C 7/32 60/802 |
| 2012/0324899 A1 | * | 12/2012 | DiBenedetto ........... F01D 25/18 60/772 |
| 2014/0064930 A1 | * | 3/2014 | NguyenLoc ............ F01D 15/12 415/122.1 |
| 2014/0069743 A1 | * | 3/2014 | Xu .......................... F01D 25/18 184/6.11 |

OTHER PUBLICATIONS

International Search Report and Written Opinion for Application No. PCT/US2014/054451 dated Jun. 11, 2015.

International Preliminary Report on Patentability for Application No. PCT/US2014/054457 dated Mar. 24, 2016.

* cited by examiner

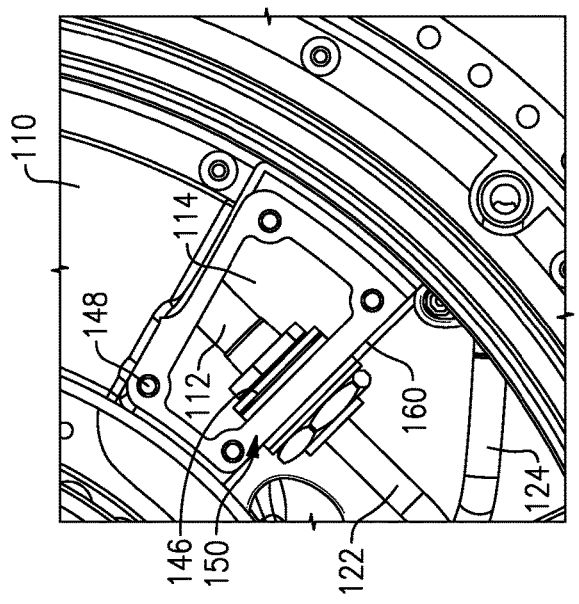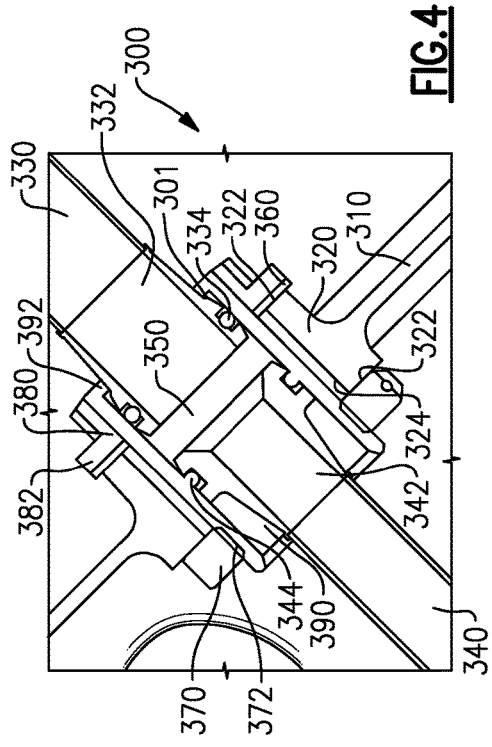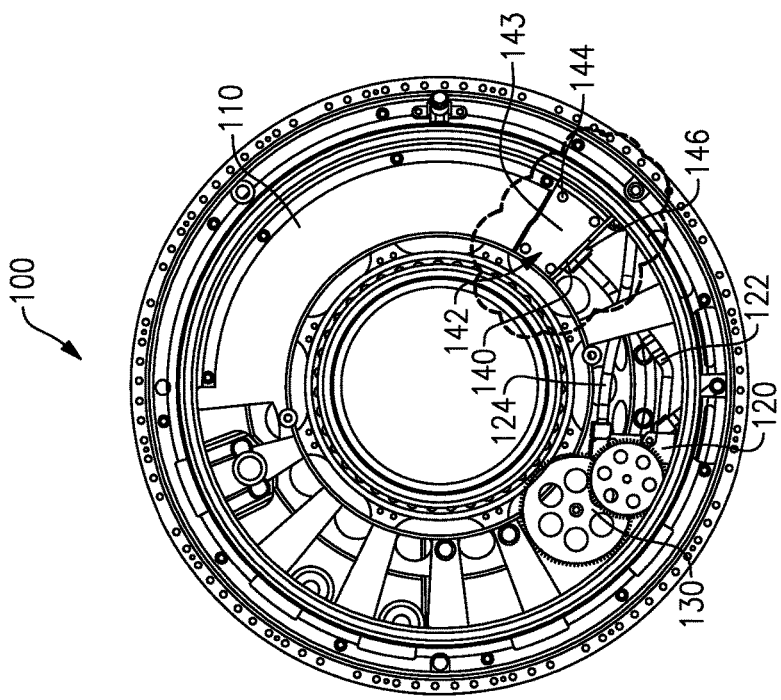

RESERVOIR EGRESS FLUID COUPLER

CROSS-REFERENCE TO RELATED APPLICATION

This application claims priority to U.S. Provisional Application No. 61/875,245 filed Sep. 9, 2013.

TECHNICAL FIELD

The present disclosure relates generally to bearing supports for a turbine engine, and more specifically to a fluid reservoir coupling within a bearing support.

BACKGROUND OF THE INVENTION

Gas turbine engines, such as those used in commercial aircraft, utilize a fan, compressor, combustor and turbine section arranged sequentially to generate thrust and propel the aircraft forward. Each of the sections within the engine core is structurally supported via multiple rolling element bearing systems which are in turn supported by a bearing support. A typical gas turbine engine has the fan directly coupled to the low pressure turbine. The previously described configuration balances fan efficiency and low pressure turbine efficiency which results in overall reduction in engine efficiency. The Geared Turbo Fan utilizes a Fan Drive Gear System (FDGS) which is a planetary gear arrangement that allows the fan to turn at a different angular velocity than that of the low pressure turbine. The final gear ratio allows for the fan and the low pressure turbine to turn at a speed of optimized efficiency. The gears within the FDGS arrangement utilize journal type bearings to facilitate packaging. During standard aircraft operations, a fluid pump provides oil from a main oil supply to the various components within the turbine engine to provide for lubrication and cooling. However, certain conditions may occur during operation of the engine, such as an in flight shutdown, where the primary oil supply cannot operate. During these times, an auxiliary oil supply stored within a bearing support is utilized to provide lubricating and cooling oil to journal bearings within the FDGS. The fluid pump within the bearing support is mechanically driven, rather than electrically driven, and as such can operate during the times when electrical power is unavailable.

The fluid from the auxiliary oil supply is distributed to the bearings via a pump that is connected to the auxiliary oil supply via a fluid tube. The fluid tube is connected to the auxiliary oil supply via a fluid coupler fixed in a fluid egress portion of the auxiliary oil supply. In current bearing supports, the fluid coupler is fixed into the fluid egress using a single setting epoxy and is blind fit to a reservoir tube within the auxiliary oil supply. If the blind fit fails, significant leakage can occur resulting in an unusable bearing support. As the bearing supports are cast pieces, and the epoxy is a single use epoxy, when the leakage is significant enough to make the part unusable the entire bearing support is scrapped and remanufactured.

Furthermore, the epoxy used in existing fluid coupler arrangements can break without warning, necessitating the use of a secondary retention feature to prevent the fluid coupler from disengaging entirely when the epoxy breaks down during operation.

SUMMARY OF THE INVENTION

A gas turbine engine according to an exemplary embodiment of this disclosure, among other possible things includes a compressor section and a drive shaft that drives the compressor section, a bearing support positioned fore of the compressor section along a primary flowpath, the bearing support supporting the drive shaft, and the bearing support internally includes a fluid reservoir having a reservoir tube extending therefrom, a fluid pump having a fluid pump tube extending therefrom, a fluid coupler adapted for repeatable coupling and decoupling of a free end of the reservoir tube to a free end of the fluid pump tube.

In a further embodiment of the foregoing gas turbine engine, the fluid coupler includes a connector for enabling repeated coupling and decoupling of the fluid coupler, the bearing support includes a housing cover, the cover including a removable access cover portion, providing access to the coupler connector, whereby repeated coupling and decoupling of the free end of the reservoir tube to the free end of the fluid pump tube is provided by removing the removable access cover portion rather than removing the housing cover.

In a further embodiment of the foregoing gas turbine engine, the fluid coupler comprises a cylindrical body defining an axis and having a flange located on a first axial end of the cylindrical body, and an end portion of one of the at least one fluid tube and the reservoir tube is disposed within the fluid coupler.

In a further embodiment of the foregoing gas turbine engine, the fluid pump is fluidly connected the compressor section, such that cooling fluid from the fluid reservoir is provided to the of the compressor section.

In a further embodiment of the foregoing gas turbine engine, the fluid coupler is a machined component and the fluid reservoir is a cast component including at least one machined surface.

In a further embodiment of the foregoing gas turbine engine, further including a gasket positioned between the flange and a machined surface of the reservoir body.

In a further embodiment of the foregoing gas turbine engine, an end portion of each of the at least one fluid tube and the reservoir tube is positioned within the fluid coupler.

In a further embodiment of the foregoing gas turbine engine, at least one of the end portions of the at least one fluid tube and the reservoir tube are sealed against an inner surface of the fluid coupler.

A turbine engine bearing support according to an exemplary embodiment of this disclosure, among other possible things includes a fluid reservoir having at least a first fluid egress, a fluid pump connected to the fluid egress via at least one fluid tube, a fluid coupler connecting one end of the at least one fluid tube to a reservoir tube at least partially in the fluid reservoir, the fluid coupler includes a cylindrical body defining an axis and having a flange located on a first axial end of the cylindrical body, and an end portion of one of the at least one fluid tube and the reservoir tube is disposed within the fluid coupler.

In a further embodiment of the foregoing turbine engine bearing support, the fluid coupler is a machined component and the fluid reservoir is a cast component including at least one machined surface.

In a further embodiment of the foregoing turbine engine bearing support, an end portion of each of the at least one fluid tube and the reservoir tube is positioned within the fluid coupler.

In a further embodiment of the foregoing turbine engine bearing support, the fluid coupler is an integral end portion of one of the at least one the fluid tube and the reservoir tube.

In a further embodiment of the foregoing turbine engine bearing support, the fluid coupler further includes a outer threaded surface on an end axially opposite the flanges.

A further embodiment of the foregoing turbine engine bearing support includes a fastening component interfacing with the threaded portion, the fastening component contacts a second machined surface of the fluid reservoir, and the fastening component and flanges interact to seal the fluid coupler to the fluid reservoir and maintain the fluid reservoir in position.

A further embodiment of the foregoing turbine engine bearing support includes a gasket positioned between the fastening component and the second machined surface of the fluid reservoir.

A further embodiment of the foregoing turbine engine bearing support includes a gasket positioned between the flange and a machined surface of the reservoir body.

A further embodiment of the foregoing turbine engine bearing support includes a machine access opening into the fluid reservoir, and a cover sealed to the machine access opening.

In a further embodiment of the foregoing turbine engine bearing support, the fluid coupler is positioned in the fluid egress.

In a further embodiment of the foregoing turbine engine bearing support, at least one of the end portions of the at least one fluid tube and the reservoir tube are sealed against an inner surface of the fluid coupler.

In a further embodiment of the foregoing turbine engine bearing support, the at least one fluid tube and the reservoir tube are sealed against an inner surface of the fluid coupler using an O-ring seal.

These and other features of the present invention can be best understood from the following specification and drawings, the following of which is a brief description.

BRIEF DESCRIPTION OF THE DRAWINGS

FIG. 2 schematically illustrates a bearing support component for the gas turbine engine of FIG. 1.

FIG. 3 illustrates a zoomed in fluid egress portion of the bearing support component of FIG. 2.

FIG. 4 schematically illustrates an example fluid coupler for use in the fluid egress of FIG. 3.

DETAILED DESCRIPTION OF AN EMBODIMENT

Figure 1:
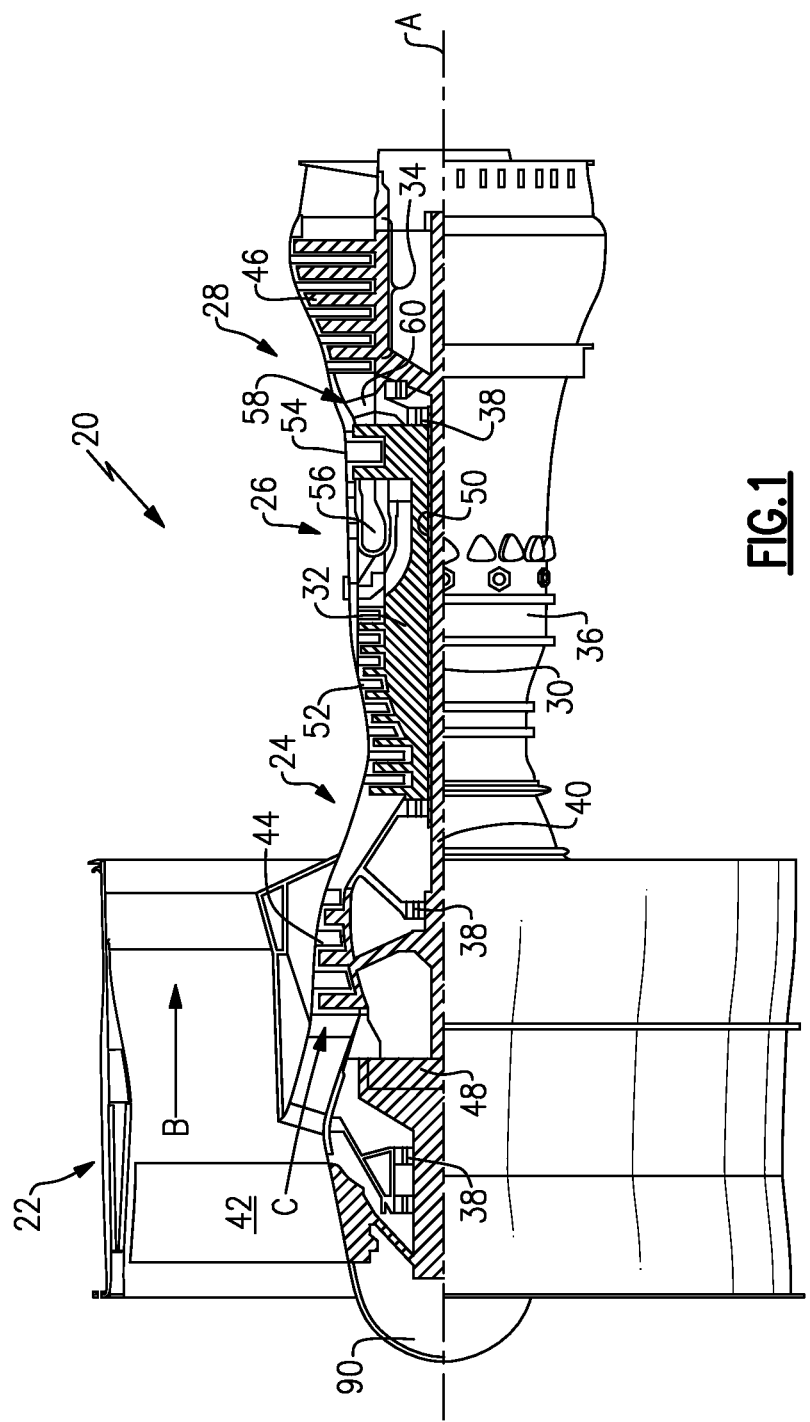
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Positioned within a nose portion 90 of the turbine engine 20 of FIG. 1 is a bearing support 100 illustrated in FIG. 2. The bearing support 100 includes a fluid reservoir 110 for storing and recirculation of cooling/lubricating fluid for an auxiliary oil supply that is utilized when the primary oil supply cannot be operated.

A fluid pump 120 is connected to the fluid reservoir 110 via a first fluid tube 122. The fluid pump 120 is driven mechanically by a gearing system 130. The gearing system 130 utilizes mechanical motion of the inner shaft 40 to drive the fluid pump 120. In alternate examples, the fluid pump 120 can be driven by a locally stored electrical power source instead of the gearing system 130. A second fluid tube 124 connects the fluid pump to the journal bearings of the geared architecture 48.

The first fluid tube 122 is connected to the fluid reservoir 110 at a fluid reservoir egress 140. The fluid egress 140 portion of the fluid reservoir 110 includes a machine access section 143 that is closed off in final assembly via a cover plate 142. The cover plate 142 can be attached to the fluid reservoir 110 via standard fasteners 144, or permanently sealed via welding or any other sealing arrangement. Positioned within a wall of the fluid egress portion 140 of the fluid reservoir 110 is a fluid coupler 146 that couples the first tube 122 to a reservoir tube (pictured in FIGS. 3-7). The reservoir tube is positioned within the fluid reservoir 110.

FIG. 3 schematically illustrates the fluid egress portion 140 of the fluid reservoir 110 and the bearing support 100 of FIG. 2. The fluid coupler 146 passes through a cast wall 160 of the fluid reservoir 110 and connects the first fluid tube 122 to the reservoir tube 112. The cast wall 160 includes an opening 301 cast in the cast wall 160 to allow for positioning of the fluid coupler 146. In order to provide a full seal, certain faces of the cast wall 160 are machined to provide a smoother finish. The machine access section 114 is included within the fluid reservoir 110 in order to facilitate this machining. As can be seen in FIG. 3, with the cover plate 142 removed, there is ready access to the interior of the fluid reservoir 110. This access allows the machining to be performed and allows the fluid coupler 146 to be connected to the reservoir tube 112 and the first fluid tube 122 without requiring a blind fit.

When the fluid coupler 146 is positioned in the cast wall 160 and the fluid tube 122 and the reservoir 112 are connected to the fluid coupler 146, the cover plate 142 is attached to a cover plate connection feature 150 such as a flange wall. In other examples the cover plate connection feature 150 can be any physical feature of the reservoir capable of connecting to and supporting, the cover plate 142.

Region 114 is part of the fluid reservoir region 140 and extends upwards into the fluid reservoir 110. Once the cover plate 142 has been attached, the fluid reservoir region 140, including region 114, is filled with cooling and lubricating oil.

FIG. 4 schematically illustrates a cross sectional view of a fluid coupler arrangement 300 positioned in a cast wall 310 of a fluid reservoir in a bearing support. A fluid coupler retaining section 320 of the cast wall 310 includes a machined face 322 and a cast face 324. Positioned within the fluid coupler retaining section 320 is a fluid coupler 380. The fluid coupler 380 is a cylindrical coupler and includes a flange located proximate to one axial end of the fluid coupler 380. A threaded portion 372 of the exterior surface of fluid coupler 380 is located proximate an axial end of the fluid coupler 380 opposite the flange 382. A nut 370, or other fastening feature, interfaces with the threaded portion 372 and contacts one of the machined faces 322 of the cast wall 310. Positioned between the flanges 382 and a machined face 322 opposite the machined face 322 interfacing with the nut 370 is a sealing gasket 360. The sealing gasket 360 seals the gap between the fluid coupler 380 and the cast hole in the cast wall 310, thereby minimizing oil leakage out of the fluid reservoir section.

An end piece 342 of a first fluid tube 340 is inserted into a first axially aligned opening of a first flange end 390 in the fluid coupler 380. Similarly an end piece 332 of a reservoir tube 330 is inserted into a second axially aligned opening of a second flange end 392 in the fluid coupler 380. The axially aligned openings of the first flange end 390 and the second flange end 392 are on opposite ends of the fluid coupler 380, and provide a passageway for fluid to exit the fluid egress section of the fluid reservoir. Each of the end pieces 332, 342 are sealed to the interior surface of the fluid coupler 380 via respective first and second standard O-ring seals 334, 344.

It is to be appreciated that the disclosed O-ring configuration is one possible sealing option. For example, instead of a double O-ring configuration, a single O-ring seal within the central opening of the fluid coupler 380 is sufficient to prevent leakage of the fluid contained in the fluid reservoir 110. However, the redundancy in sealing in the double O-ring configuration provides safety benefits that would be appreciated by one skilled in the art.

The presence of the O-ring seals 334, 344 allows a gap 350 to be present between the end pieces 332, 342 of the fluid tubes 330, 340 further easing assembly of the fluid coupler arrangement 300.

In the fluid coupler arrangement 300 of FIG. 4, the second flange end 392 of the fluid coupler 380 is positioned within the fluid reservoir and first the flange end 390 having threading portion 372 is positioned outside the fluid reservoir. In alternate configurations of a coupler, the arrangement 300 can be preserved with the flange 382 positioned outside the fluid reservoir and the threaded portion 372 positioned within the fluid reservoir.

Figure 5:
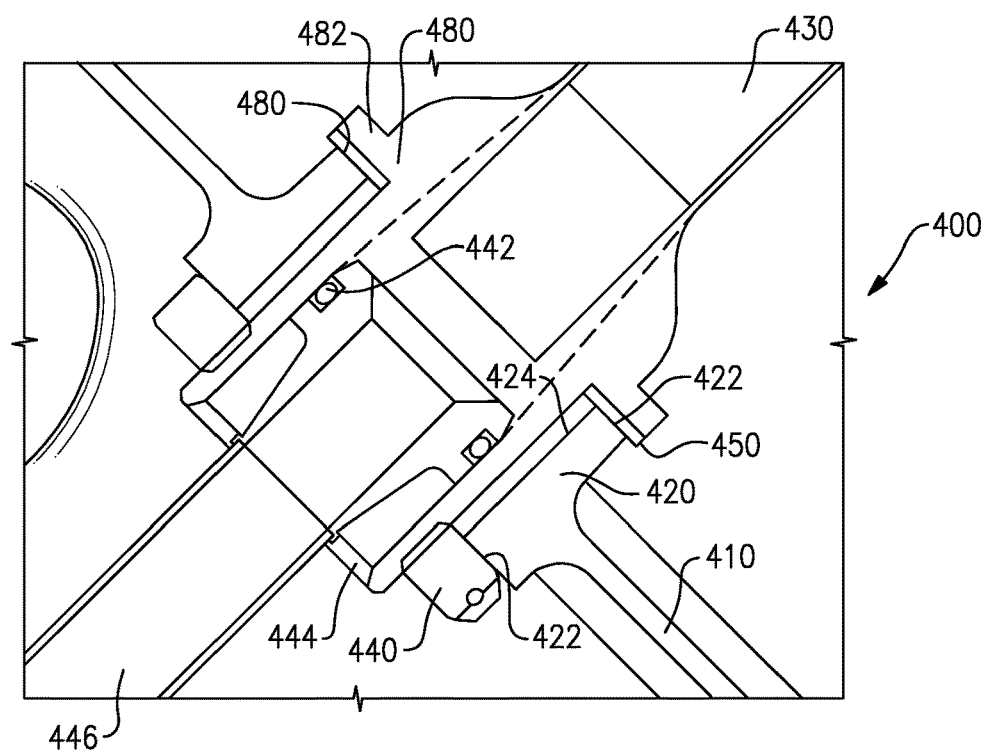
FIG. 5 schematically illustrates an alternate example fluid coupler for use in the fluid egress of FIG. 3.

FIG. 5 schematically illustrates an example fluid coupler arrangement 400 in which the fluid coupler 480 is also the end piece of a fluid reservoir tube 430. As with the previous examples, the fluid coupler 480 is positioned in a cast opening 424 in the fluid reservoir wall 410, with flanges 422 on one axial end interfacing gasket 450. The gasket 450 contacts a machined surface 422 of the cast wall 410, and a nut 440 interfaces with another machined surface 422 of the cast wall 410.

An end piece 444 of the fluid tube 446 connecting the fluid coupler 480 to the fluid pump 120 (illustrated in FIG. 2) is inserted into the fluid coupler 480, and sealed to the interior of the fluid coupler 480 via a standard O-ring seal 442, or any other standard seal type. As described above, a single seal 442 is sufficient to prevent leakage from the fluid reservoir through the fluid egress portion.

In an alternate arrangement, the end of the fluid coupler 480 including the flanges 482 can be exterior to the fluid reservoir. In this arrangement the fluid coupler 480 is integrally connected to the fluid tube 446 instead of the reservoir tube 430, and the nut 440 is positioned within the fluid reservoir.

Figure 6:
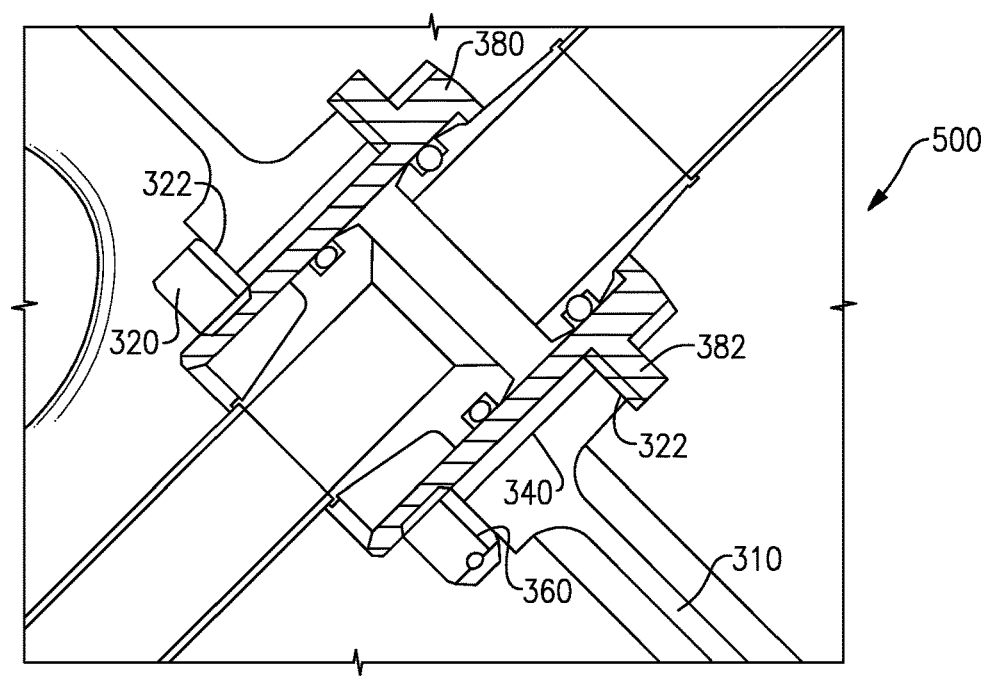
FIG. 6 schematically illustrates an alternate example fluid coupler for use in the fluid egress of FIG. 3.

FIG. 6 illustrates an alternate fluid coupler 380. The alternate fluid coupler 380 is identical to the fluid coupler 380 of FIG. 4, and is positioned in the same cast opening 340 in the cast wall 310. The gasket 360, however, is positioned on the threaded end of the fluid coupler 380 between the nut 320 and the machined surface 322 of the cast wall 310. In this example, the flanges 382 directly contact the machined surface 322 within the fluid reservoir. As with all the previous examples, the fluid coupler arrangement 500 illustrated in FIG. 6 can be flipped such that the flanges 382 are exterior to the fluid reservoir and the nut 370, or other fastener, is positioned within the fluid reservoir.

In bearing supports utilizing any of the above described fluid coupler arrangements (shown in FIGS. 3-6), the fluid coupler can be repaired or replaced without requiring replacing the entire bearing support. Furthermore, during an engine inspection, such as standard maintenance procedures, the cover plate 142 can be removed (illustrated in FIG. 2) to perform a visual inspection of the coupling arrangement. In contrast, single use epoxy fittings, such as were previously known cannot be inspected, and preventative maintenance is not performed.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section and a drive shaft that drives the compressor section;
a bearing support positioned fore of the compressor section along a primary flowpath, the bearing support supporting the drive shaft, and wherein the bearing support internally comprises:
a fluid reservoir having a reservoir tube extending therefrom;
a fluid pump having a fluid pump tube extending therefrom;
a fluid coupler adapted for repeatable coupling and decoupling of a free end of the reservoir tube to a free end of the fluid pump tube wherein the fluid coupler comprises a cylindrical body defining an axis and having a flange located on a first axial end of the cylindrical body; and
wherein an end portion of at least one of the fluid pump tube and the reservoir tube is disposed within the fluid coupler.

2. The gas turbine engine of claim 1, wherein said fluid pump is fluidly connected the compressor section, such that cooling fluid from said fluid reservoir is provided to the compressor section.

3. The gas turbine engine of claim 1, wherein the fluid coupler is a machined component and the fluid reservoir is a cast component including at least one machined surface.

4. The gas turbine engine of claim 1, further comprising a gasket positioned between the flange and a machined surface of the a reservoir body of the fluid reservoir.

5. The gas turbine engine of claim 1, wherein an end portion of each of the fluid pump tube and the reservoir tube is positioned within the fluid coupler.

6. The gas turbine engine of claim 1, wherein at least one of the end portions of the at fluid pump tube and the reservoir tube is sealed against an inner surface of the fluid coupler.

7. A turbine engine bearing support comprising:
a fluid reservoir having at least a first fluid egress;
a fluid pump connected to the fluid egress via at least one fluid tube;
a fluid coupler connecting one end of the at least one fluid tube to a reservoir tube at least partially in the fluid reservoir;
wherein the fluid coupler comprises a cylindrical body defining an axis and having a flange located on a first axial end of the cylindrical body; and
wherein an end portion of one of the at least one fluid tube and the reservoir tube is disposed within the fluid coupler.

8. The turbine engine bearing support of claim 7, wherein the fluid coupler is a machined component and the fluid reservoir is a cast component including at least one machined surface.

9. The turbine engine bearing support of claim 7, wherein an end portion of each of the at least one fluid tube and the reservoir tube is positioned within the fluid coupler.

10. The turbine engine bearing support of claim 7, wherein the fluid coupler is an integral end portion of one of the at least one fluid tube and the reservoir tube.

11. The turbine engine bearing support of claim 7, wherein the fluid coupler further comprises an outer threaded surface on an end axially opposite the first axial end.

12. The turbine engine bearing support of claim 11, further comprising a fastening component interfacing with said outer threaded surface, wherein the fastening component contacts a machined surface of the fluid reservoir, and the fastening component and flanges interact to seal the fluid coupler to the fluid reservoir and maintain the fluid reservoir in position.

13. The turbine engine bearing support of claim 12, further comprising a gasket positioned between the fastening component and the second machined surface of the fluid reservoir.

14. The turbine engine bearing support of claim 7, further comprising a gasket positioned between the flange and a machined surface of the reservoir body.

15. The turbine engine bearing support of claim 7, further comprising;
a machine access opening into said fluid reservoir; and
a cover sealed to said machine access opening.

16. The turbine engine bearing support of claim 7, wherein the fluid coupler is positioned in the fluid egress.

17. The turbine engine bearing support of claim 7, wherein at least one of the end portions of the at least one fluid tube and the reservoir tube are sealed against an inner surface of the fluid coupler.

18. The turbine engine bearing support of claim 17, wherein the at least one fluid tube and the reservoir tube are sealed against an inner surface of the fluid coupler using an O-ring seal.

* * * * *